US009026065B2

(12) United States Patent
Peterson et al.

(10) Patent No.: US 9,026,065 B2
(45) Date of Patent: May 5, 2015

(54) METHODS AND APPARATUS FOR RESOURCE SHARING FOR VOICE AND DATA INTERLACING

(75) Inventors: David R. Peterson, Fort Wayne, IN (US); Timothy S. Loos, Fort Wayne, IN (US); David F. Ring, Fort Wayne, IN (US); James F. Keating, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 277 days.

(21) Appl. No.: 13/425,519

(22) Filed: Mar. 21, 2012

(65) Prior Publication Data
US 2013/0252563 A1    Sep. 26, 2013

(51) Int. Cl.
*H04B 1/44*    (2006.01)
*G10L 19/16*    (2013.01)
*H04B 1/48*    (2006.01)
*G10L 25/78*    (2013.01)

(52) U.S. Cl.
CPC ............. *G10L 19/167* (2013.01); *H04B 1/48* (2013.01); *H04B 2001/485* (2013.01); *G10L 25/78* (2013.01)

(58) Field of Classification Search
CPC ...... H04B 1/44; H04B 1/48; H04B 2001/485; G10L 19/167; G10L 25/78
USPC .......... 455/83, 466, 40, 72, 98; 704/201, 232, 704/253, 270; 379/93.08
See application file for complete search history.

(56) References Cited

U.S. PATENT DOCUMENTS

| 5,859,878 | A | * | 1/1999 | Phillips et al. | ................. | 375/316 |
| 6,067,517 | A | * | 5/2000 | Bahl et al. | ................. | 704/256.4 |
| 7,020,708 | B2 | * | 3/2006 | Nelson et al. | ................. | 709/230 |
| 7,471,672 | B2 | * | 12/2008 | Toyoda | ......................... | 370/352 |
| 7,729,263 | B2 | * | 6/2010 | True et al. | ...................... | 370/238 |
| 7,796,954 | B2 | * | 9/2010 | Whitaker Filho | ................. | 455/73 |
| 8,045,919 | B2 | * | 10/2011 | Rhodes et al. | ................... | 455/40 |
| 8,155,641 | B2 | * | 4/2012 | Hirsch | .......................... | 455/431 |
| 8,179,868 | B2 | * | 5/2012 | Ishikawa | ....................... | 370/337 |
| 8,249,866 | B2 | * | 8/2012 | Miseki | .......................... | 704/223 |
| 8,250,221 | B2 | * | 8/2012 | Nelson et al. | ................. | 709/228 |
| 8,284,674 | B2 | * | 10/2012 | True et al. | ...................... | 370/238 |
| 8,290,696 | B1 | * | 10/2012 | Sridhar et al. | ................. | 701/120 |
| 8,467,915 | B1 | * | 6/2013 | Pangilinan et al. | ............... | 701/3 |
| 8,520,624 | B2 | * | 8/2013 | Husted et al. | ................... | 370/329 |
| 8,526,424 | B2 | * | 9/2013 | Cherchali et al. | ............. | 370/352 |
| 8,554,562 | B2 | * | 10/2013 | Aronowitz | ..................... | 704/250 |
| 8,600,585 | B2 | * | 12/2013 | Pangilinan et al. | ............... | 701/3 |
| 8,610,619 | B2 | * | 12/2013 | Andersson et al. | ............. | 342/36 |

OTHER PUBLICATIONS

CDR Brett Easier, USN, Chief of Naval Operations N885F1, Naval Air Systems Command PMA2135, "Joint Precision Approach and Landing System (JPALS), Program Overview Jun. 2008", 20 pages.

* cited by examiner

*Primary Examiner* — Marceau Milford
(74) *Attorney, Agent, or Firm* — Daly, Crowley, Mofford & Durkee, LLP

(57) ABSTRACT

Methods and apparatus for voice and data interlacing in a system having a shared antenna. In one embodiment, a voice and data communication system has a shared antenna for transmitting and receiving information in time slots, wherein the antenna can only be used for transmit or receive at a given time. The system determines timing requirements for data transmission and reception and interrupts data transmission for transmission of speech in selected intervals while meeting the data transmission timing and throughput requirements. The speech can be manipulated to fit with the selected intervals, to preserve the intelligibility of the manipulated speech.

19 Claims, 8 Drawing Sheets

METHODS AND APPARATUS FOR RESOURCE SHARING FOR VOICE AND DATA INTERLACING

STATEMENT REGARDING FEDERALLY SPONSORED RESEARCH

The invention was made with government support under Contract No. W15P7T-06-D-E402-0090. The government has certain rights in the invention.

BACKGROUND

As is known in the art, voice and data can be communicated using a variety of equipment. Typically, separate radios are used for each function to provide independent operation. However, in some applications space, weight, power, and cost are extremely limited which can be problematic in providing desired functionality.

Sufficient redundancy exists in speech such that even if some portion of a speech waveform is lost, intelligible speech may still be conveyed to the listener. Also, many data links are designed to provide acceptable performance in the event that some of the messages are missed. One example is Air Traffic Control voice operating concurrently with an Air Traffic Landing data link.

FIG. 1 shows a prior art system 10 having independent voice and data radios 12, 14 that operate in a half-duplex mode. The first radio 12 is coupled to an antenna 16 and a voice sink 32 and a voice source 34. Similarly, the second radio 14 is coupled to an antenna 26 and to a data sink 22 and a data source 24.

Note that when a receiver is connected to its antenna, the corresponding sink receives its information, and conversely, when the transmitter is connected to its antenna, it can accept information from the corresponding source and send it out the antenna.

SUMMARY

Exemplary embodiments of the invention provide methods and apparatus for incorporating voice and data in a radio having one or two receivers and one transmitter. While exemplary embodiments of the invention are shown and described in conjunction with particular configurations, applications, and components, it is understood that embodiments of the invention are applicable to communication systems in general in which it is desirable to share transmit and/or receive resources.

In one aspect of the invention, a method comprises a voice and data communication system having a shared antenna for transmitting and receiving information in time slots, wherein the antenna can only be used for transmit or receive at a given time, determining timing requirements for data transmission and reception, interrupting data transmission for transmission of speech in selected intervals while meeting the data transmission timing and throughput requirements, and manipulating the speech to fit with the selected intervals, to preserve the intelligibility of the manipulated speech.

The method can further include one or more of the following features: compressing the duration of the speech, limiting data interruption to a predetermined duration, employing independent receivers or transmitters, limiting downlink voice interruption to a predetermined amount, and/or sensing the presence of speech to determine what segments of the audio input may be discarded without degrading intelligibility.

In another aspect of the invention, a system comprises an antenna, a voice and data communication system sharing the antenna for transmitting and receiving information in time slots, wherein the antenna can only be used for transmit or receive at a given time, a data/voice timing control module to determine timing requirements for data transmission and reception and to interrupt data transmission for transmission of speech in selected intervals while meeting the data transmission timing and throughput requirements, and a speech analysis and control module to manipulate the speech to fit with the selected intervals, to preserve the intelligibility of the manipulated speech.

The system can further include one or more of the following features: the manipulated speech is compressed, the data interruption is limited to a predetermined duration, independent receivers and/or transmitters, the data is source and sinked by a navigation system, a data encoder and a data decoder for the data, and/or a transmit/receive switch coupled to the antenna.

In a further aspect of the invention, a system comprises an antenna, a speech source, a speech sink, a data source, and a data sink, a transmit/receive/switch coupled to the antenna, a speech analysis and control module coupled to the speech source, a data/voice timing control module coupled between the speech analysis and control module and the transmit/receive/switch, a transmit switch coupled to the data/voice timing control module, the speech analysis and control module, and a RF transmit module, which is coupled to the transmit/receive/switch, a speech demodulator coupled to the speech sink, a RF receive module coupled to the speech demodulator, a data decoder, and a time division control module, which is coupled to the data/voice timing control module, and a data encoder coupled to the data source, the time division control module, and data/voice timing control module, wherein the data decoder is coupled to the data sink.

BRIEF DESCRIPTION OF THE DRAWINGS

The foregoing features of this invention, as well as the invention itself, may be more fully understood from the following description of the drawings in which.

DETAILED DESCRIPTION

Figure 2:
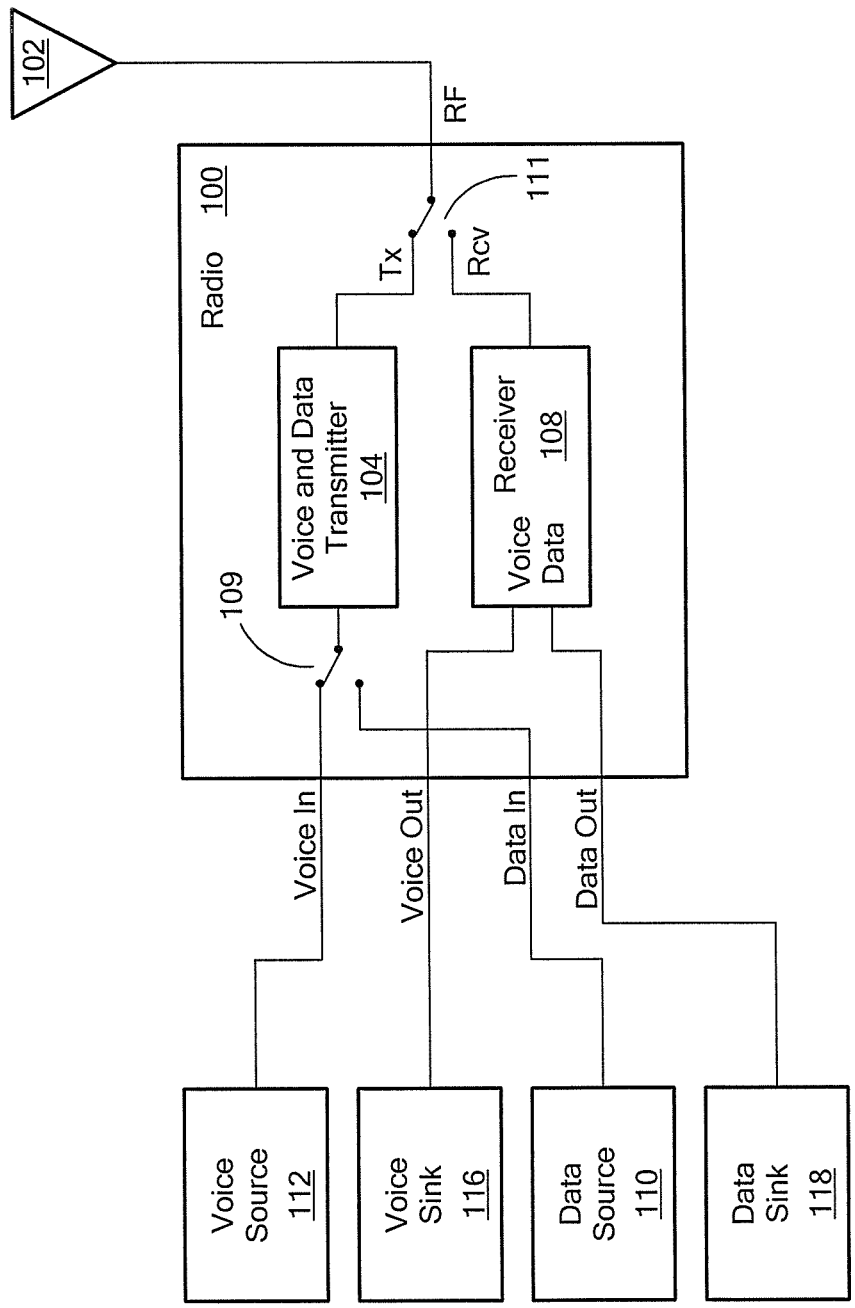
FIG. 2 is a schematic representation of a data and voice communication system sharing an antenna for receiving and transmitting.
Figure 2A:
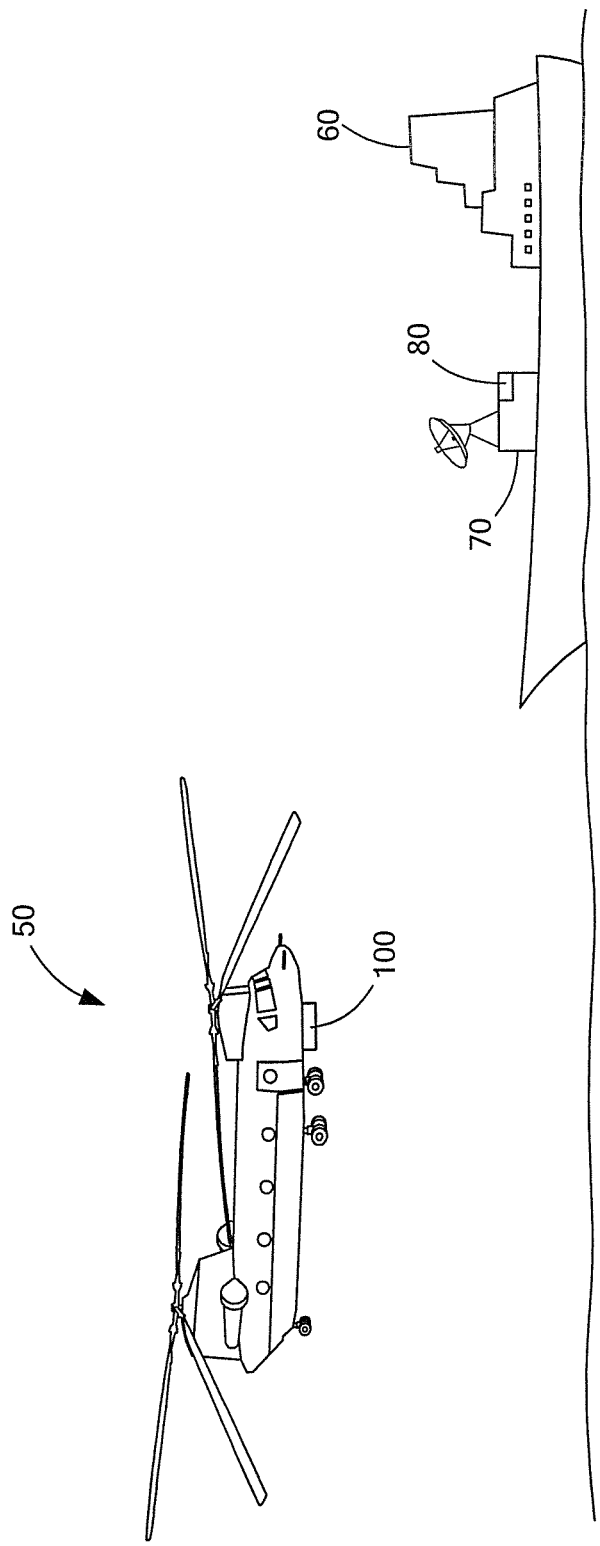
FIG. 2A is a schematic representation of an exemplary aircraft having data and voice communication system to communicate with an air traffic control system on a vessel.

FIGS. 2 and 2A show a radio system 100 on a vehicle 50 to enable data and voice communication between first and second systems. In one embodiment, the radio system 100 is attached to an aircraft 50, such as a helicopter, to enable the exchange of voice and data between the aircraft 50 and an air traffic control system 70 and a data system 80 for landing, which can be located on a ship 60 or on the ground.

The radio system 100 includes an antenna 102 that is shared by a data/voice transmitter 104, a voice/data receiver 108. The data/voice transmitter 104 is selectively coupled to a data source 110 and a voice source 112 by a first switch 109. A voice sink 116 is coupled to the voice receiver port of the receiver 108 and a data sink 118 is coupled to the data port of the receiver 108. A second switch 111, which is independent from the first switch 109, has a first position to connect the antenna 102 to the data/voice transmitter 104 and a second position to connect to the interconnected inputs of the data/voice receiver 108.

In this configuration, only one of the sources of information 110, 112 can use the transmitter 104 at one time so that time sharing of the transmitter is needed. It is assumed that both RF channels to the ship 60 are available, but that the transmitter needs to be shared between the sources. In this case a transmitted signal is interrupted by the higher priority source when a conflict occurs.

The architecture of the radio system 100 inhibits reception for both sinks whenever one of the sources needs to transmit. In this configuration, the restriction is permanent, but similar limitations apply, if the isolation provided by the equipment for the two simultaneous channels is insufficient. This could occur for fixed frequency operation, if the frequency assignments happen to be chosen to be too close together, or it could occur if the frequencies become too close due to the hopping waveforms selected. In the latter case, these restrictions apply only to the interval of time for which the signals conflict with each other. For this configuration transmissions may also be interrupted, depending on how priorities are defined. The system 100 determines how to receive sufficient data while allowing transmission of voice.

In one embodiment, data is communicated as part of a landing system for an aircraft, such as the Joint Precision Approach and Landing System (JPALS). As is known in the art, JPALS is a secure all-weather landing system based on real-time differential correction of a GPS signal with a local area correction message. An onboard receiver compares the current GPS-derived position with the local correction signal to derive a highly accurate three-dimensional position to facilitate all-weather approaches via an Instrument Landing System (ILS)-type display.

Figure 3:
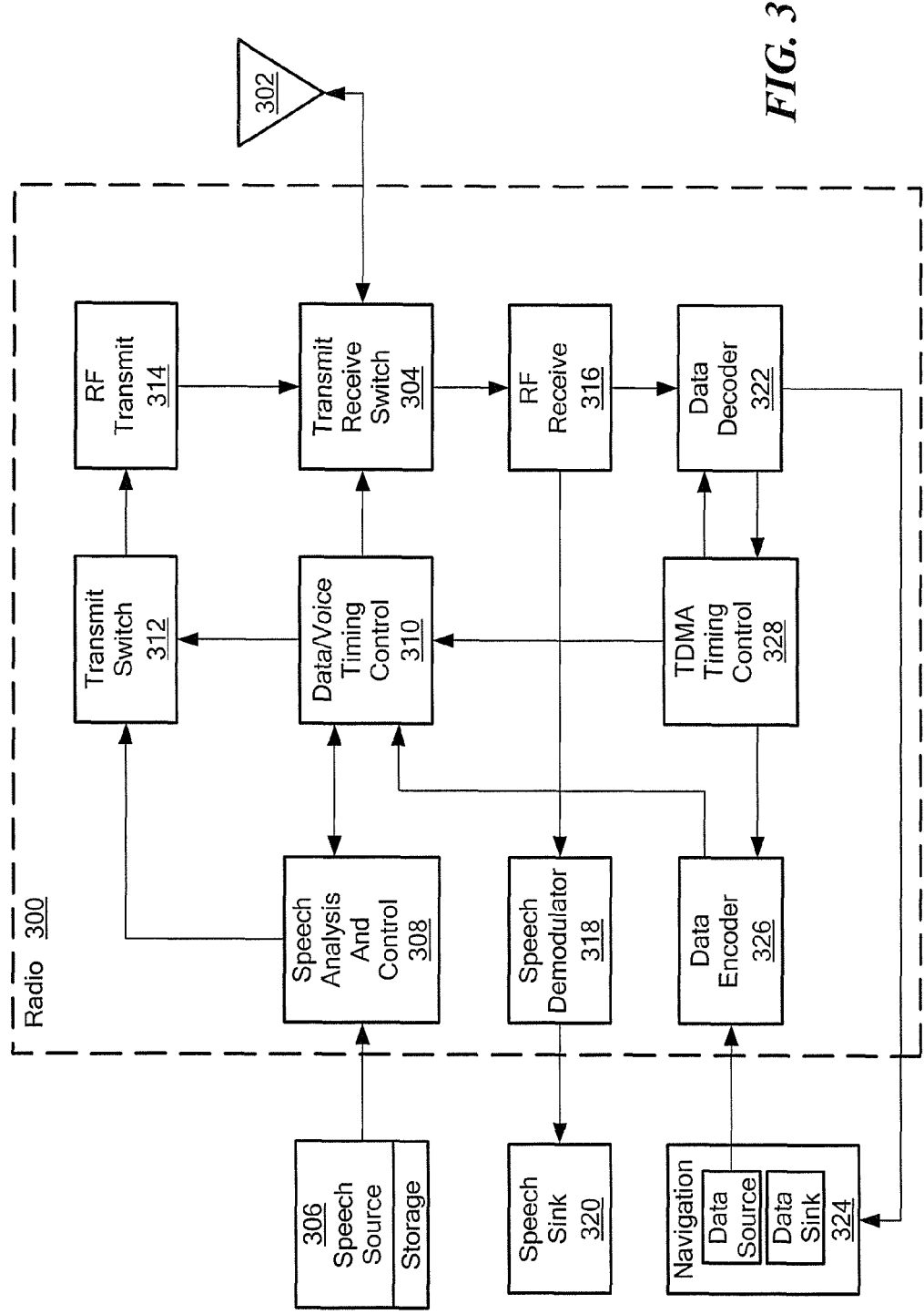
FIG. 3 is a block diagram of an exemplary data and voice communication system sharing an antenna for receiving and transmitting.

FIG. 3 shows an exemplary system 300 having voice and data interlacing in accordance with exemplary embodiments of the invention. An antenna 302 is coupled to a transmit/receive switch 304 to control access to the antenna. When Push-to-talk is initiated, a voice path is set up from a speech source 306, such as a microphone to transmit, for example, a pilot's voice. This signal is coupled to a speech analysis and control module 308. The speech analysis and control module can speed up speech, for example, to fit speech within certain time intervals while ensuring speech intelligibility. A data/voice time control module 310 controls a transmit switch 312 and the transmit/receive switch 304 to control the transmit paths and receive paths. An RF transmit module 314 processes speech from the speech analysis and control module 308 or data from the data encoder 326 for modulation on an RF carrier and input into the transmit/receive switch and transmission by the antenna 302.

Information received by the antenna 302 is provided to the transmit/receive switch 304, which is coupled to an RF receive module 316. A receive speech path extends from the RF receive module 316 to a speech demodulator 318, which is coupled to a speech sink 320 such as a speaker. A data receive path extends from the RF receive module 316 to a data decoder 322, which is coupled to a data sink of a navigation module 324. As described more fully below, navigation data is exchanged between an aircraft and an air traffic control system as the aircraft comes in for landing, for example.

The navigation module 324 includes a data source to provide data to a data encoder 326. A TDMA (time division multiple access) timing control module 328 is connected between the data encoder 326 and decoder 322 to send control information to the transmit switch 312. As described more fully below, the radio 300 enables voice and data communication over a shared antenna to meet data timing requirements and provide intelligible speech with limited slot availability. For example, a pilot can activate a push-to-talk (PTT) system in which speech is stored until it can be transmitted during intervals selected to allow the data transmission requirements to be met. The stored speech can be sped up, interrupted, or otherwise manipulated while maintaining intelligibility.

In one particular embodiment, data corresponds to data for an aircraft landing system, such as JPALS, and voice corresponds to voice for a pilot to communicate with an air traffic control system. It is understood that an exemplary embodiment of the invention using JPALS and Air Traffic Control (ATC) communication is used to facilitate an understanding of the invention and is not intended to limit the scope of the invention in any way. Other voice and data applications with shared antennas will be readily apparent to one of ordinary skill in the art and well within the scope of the claimed invention.

Table 1 below shows exemplary JPALS Data and ATC Voice Formats that identify pairs of waveforms. The voice formats are analog AM voice and the data formats are either Gaussian Minimum Shift Keying (GMSK) or Differential 8-ary Phase Shift Keying (D8PSK) modulation. In addition alternative voice formats and data formats are contemplated. SRGPS refers to shipboard relative GPS, LAAS refers to Local Area Augmentation System, and VDB refers to VHF Data Broadcast.

TABLE 1

Data and Voice Simultaneity Formats

| Data Format | Voice Format |
| --- | --- |
| JPALS SRGPS Index 1 | UHF AM |
| FJPALS SRGPS Index 2 | UHF AM (non-hopped) |
| JPALS LAAS (VDB) | VHF AM |

Figure 4:
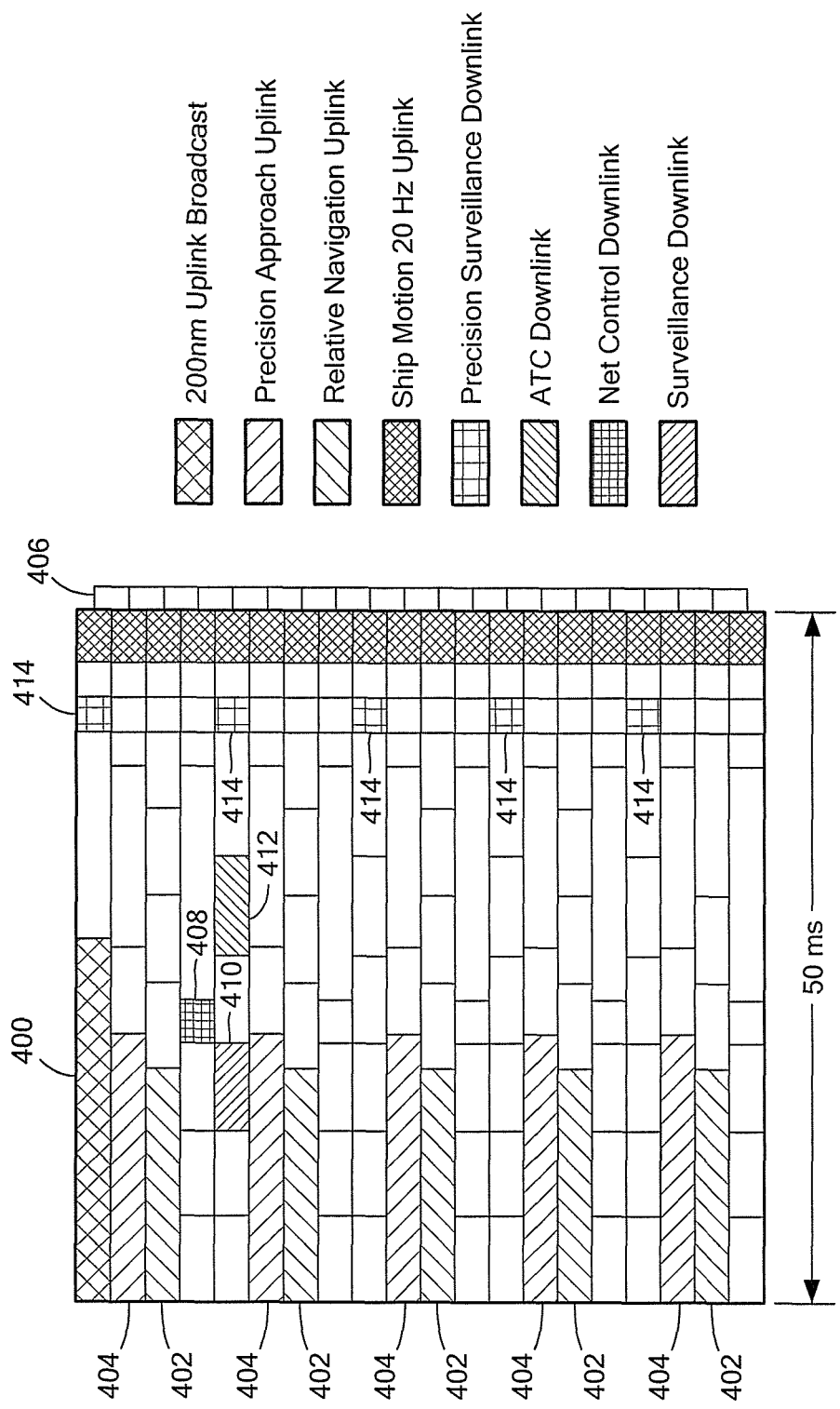
FIG. 4 is a timing diagram showing uplink and downlink messages and the unoccupied time available for voice.

FIG. 4 shows uplink and downlink transmissions for JPALS SRGPS Index 1 and 2 Formats for a single aircraft. The Uplink Slots (ULS) are receive slots and the downlink are transmit slots for the aircraft. In the illustrated embodiment, all aircraft listen to the uplink messages, but until an aircraft is within 60 nautical miles, it only listens to the 200 nautical mile Uplink Broadcast 400, a 26 ms message once per second. After logging in to the so-called Surveillance Net, the aircraft listens to the Relative Navigation Uplink 402, which is a 16 ms message 5 times per second. When it transitions to Precision Surveillance, it adds the Precision Approach Uplink message 404, a 20 ms message 5 times per second and the Ship Motion 20 Hz Uplink 406 a 4 ms message 20 times per second. Even monitoring these messages, the white space in FIG. 4 shows considerable time when the aircraft does not need to listen for messages.

When the JPALS airborne protocol is not logged into the JPALS Network there will be no transmissions until the aircraft attempts to enter the Surveillance Net, about 60 nm from the ship (or on deck before takeoff). When the 60 nm boundary is crossed (or upon power-up), the aircraft sends a Login Request message 408 comprising a single transmission of 3 to 5 ms in duration. If the aircraft receives a positive response, it begins to transmit a 6 to 9 ms Surveillance Downlink Message 410 once per second. If it does not receive a response in 3 seconds, it waits 1 to 10 seconds and repeats the single transmission 408. If it receives a "No resources available" response, it repeats the request 408 every 20 seconds until a time slot allocation or a logout command is received.

When a Surveillance Login is complete (following a positive response), the aircraft continues to transmit message 410 once per second, until the aircraft reaches 10 nm from the ship and it requests a Precision Surveillance Login. In addition, as commanded by the ship, the aircraft transmits a 7 to 11 ms message as an ATM function message 412, but only when the aircraft is logged into the Surveillance Net (not the Precision Surveillance Net). It continues the once per second transmissions until it receives a Precision Surveillance time slot allocation and Precision Surveillance Login is complete. When Precision Surveillance Login is complete, a communication system, such as ARC-231, adds five additional 6 to 9 ms Precision Surveillance transmissions 414 per second. It is understood that ARC-231 refers to an Airborne VHF/UHF/LOS and DAMA SATCOM Communications System provided by Raytheon Company of Waltham, Mass., that supports airborne, multi-band, multi-mission, secure anti-jam voice, data and imagery transmission and provides network-capable communications in a compact radio set. It will be readily appreciated that any suitable communication system can be used.

Certain waveforms are receive only for the aircraft, and in the configuration shown in FIG. 2, reception is blocked when transmitting is required. Therefore the amount of time the aircraft must listen to the ground transmissions must be taken into consideration. A variety of information can be broadcast using these waveforms. Some transmissions provide the location of the runway; others provide a description of the landing path. Because of this, the number of time slots occupied by the broadcast from a particular airport can vary. In addition, the time slots that an aircraft will choose to receive will depend on what information is needed at a particular time.

Figure 5:
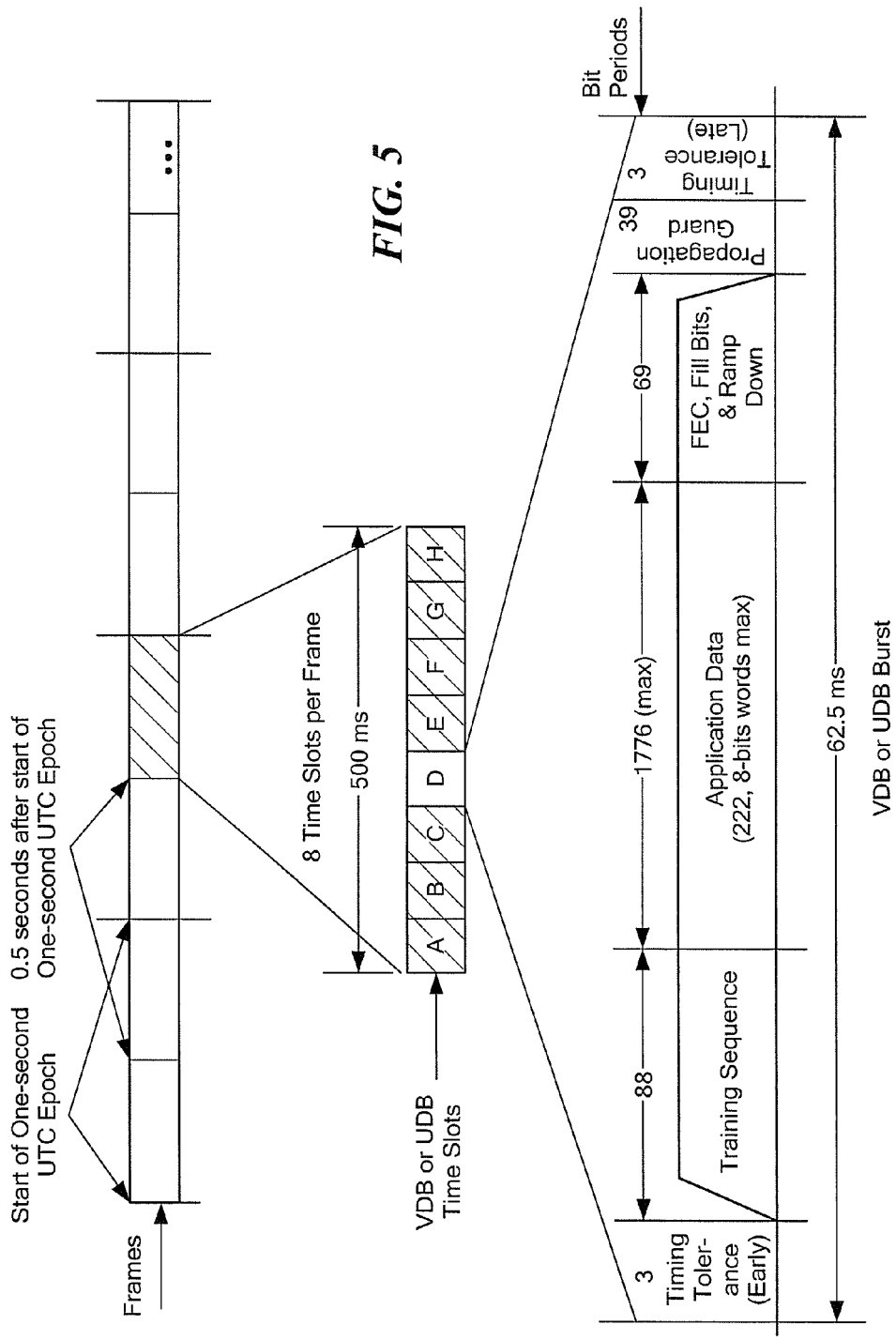
FIG. 5 is a diagram showing a VHF Data Broadcast (VDB) communication burst.

FIG. 5 shows a format used by the broadcasts for the VHF Data Broadcast (VDB) to land aircraft. Note that the format is general in that the application data is listed as 1776 ms max. In the illustrated embodiment, the number of time slots occupied can vary from 2 to 8.

Figure 6:
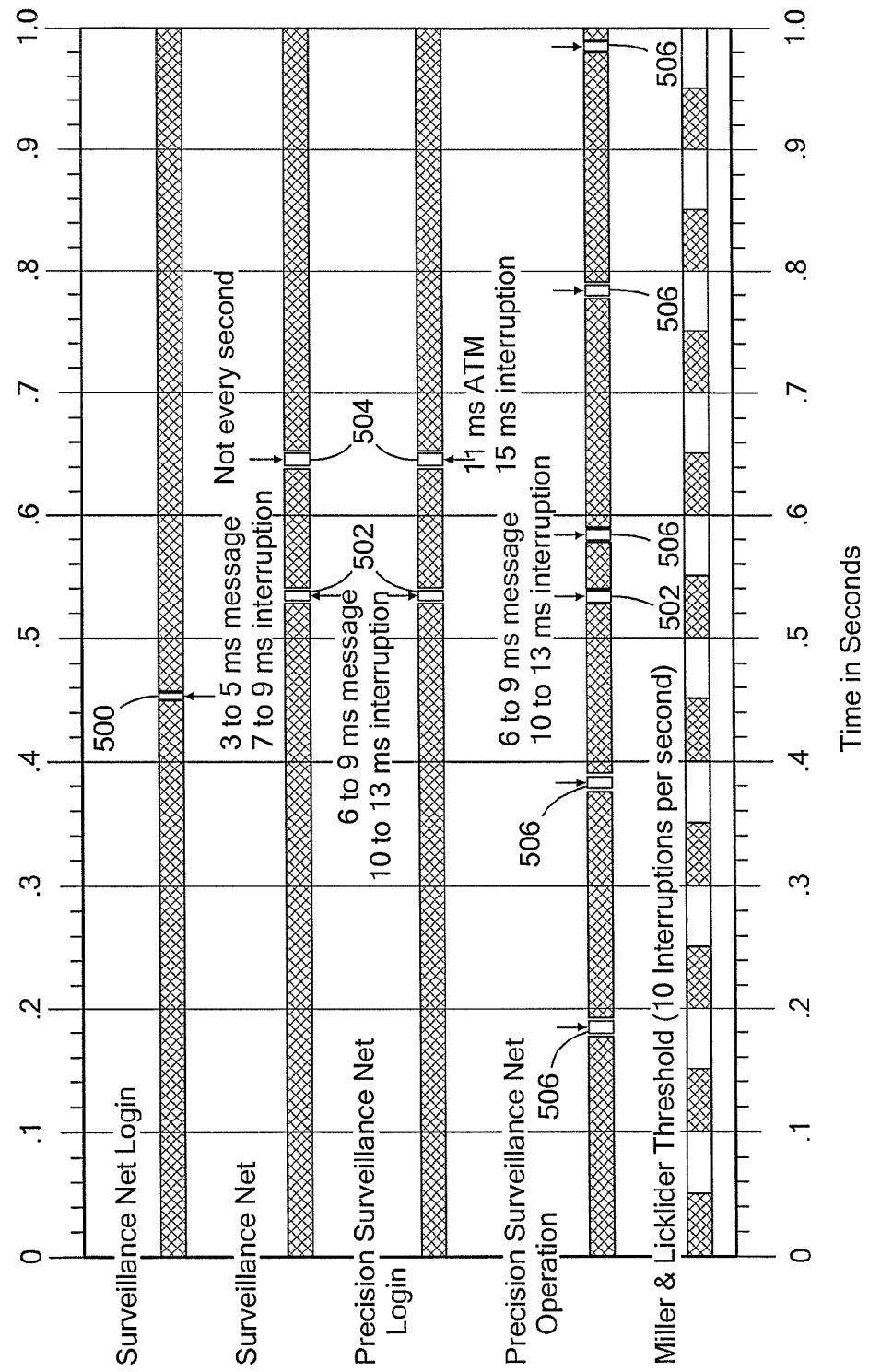
FIG. 6 is a diagram showing data communications and potential voice interruption intervals.

In an exemplary embodiment, only the Joint Precision Approach and Landing System (JPALS) waveforms require data transmissions from the aircraft. For an Index 1 type waveform these interruptions are illustrated in FIG. 6. The interruptions for Index 2 are similar. It is understood that interruptions occur only when the aircraft needs to transmit or receive data, otherwise there is no interference.

When the JPALS airborne protocol is not logged into the JPALS Network there will be no voice interruptions until it attempts to enter the Surveillance Net, about 60 nm from the ship (or on deck before takeoff). When the aircraft sends the Login Request 500, it results in an interruption of 7 to 9 ms. If the aircraft receives a positive response, it begins the interruption 502 of 10 to 13 ms once per second.

When a Surveillance Login is complete the once per second interruptions 502 occur until the aircraft reaches 10 nm from the ship and requests a Precision Surveillance Login. In addition, as commanded by the ship, a 11 to 15 ms interruption 504 occurs, but only when the aircraft is logged into the Surveillance Net (not the Precision Surveillance Net). It continues the once per second transmissions until it receives a Precision Surveillance time slot allocation and Precision Surveillance Login is complete.

When Precision Surveillance Login is complete, the air traffic control system adds five additional 10 to 13 ms interruptions 506 per second. For Index 1 the time between Precision Surveillance Downlink transmissions is 200 ms or a 5 Hz steady rate. For Index 2 the average rate is 5 Hz, but some of the times vary from 200 ms (192.4, 153.8, 196.2, 157.6, 207.6, 246.2, 203.8, 242.4, and 196.2). This results in frequencies between 4 and 6.5 Hz. Thus, to transmit the JPALS responses, the aircraft needs to transmit from 1 to 6 times per second. Normally the interruptions will be every 200 ms (Precision Surveillance with one of the intervals containing a second interruption), but the interruptions are of a duration that does not significantly disrupt the voice.

FIG. 6 shows exemplary interruptions and dark areas in which voice can be transmitted. Also shown is the Miller & Licklider speech interruption pattern that provided intelligible communication.

Table 2 shows the amount of interruptions by the JPALS modes of operation. The durations shown are far short of the typical shortest speech phoneme of 40 ms, so the listener normally hears enough of each syllable to grasp the information.

TABLE 2

Interruption of Voice by JPALS SRGPS Transmit Data

| Mode | Duration | Frequency | % Interruption |
|---|---|---|---|
| Not Logged In | None | 0 | 0 |
| Surveillance Login | 7 to 9 ms | 1 to 20 per sec | <1% |
| Precision Surveillance Login | 10 to 13 ms | 1 to 2 per sec | <3% |
| Precision Surveillance Operation | 10 to 13 ms | 6 per second | <8% |

In 1950, Miller and Licklider (*J. Acoust. Soc. Am.* 22: 167-173, 1950), which is incorporated by reference, investigated the effects of replacing syllables of speech with silence. Their results showed that periodic interruption of speech (50% on-and-off) resulted in a small decline in intelligibility if the rate of interruption was between 10 to 100 Hz. It is understood that any suitable periodic speech interruption scheme that provides acceptable speech recognition can be used. In an exemplary embodiment, for transmit interruptions, conditions are between 1 and 10 Hz, but the interruptions are significantly shorter than those disclosed by Miller and Licklider.

In the SRGPS waveforms, up to 52% of the time is dedicated to receiving packets. For VDB from 25% to 100% of the time can be dedicated to that task.

The shortest time associated with the VDB waveform is a 62.5 ms slot time, with eight slots organized into a half-second frame. If a transmit/receive timing pattern is arranged such that one slot is allocated to listen for data, followed by four slots to transmit voice, then each slot is available to listen for data at least once every two seconds, and the aircraft always has data from the ground that is no more than two seconds old. For VDB, there is a five second constraint on missed messages during landing, so the two seconds of missed data in this proposed timing should not degrade operational availability during landing.

Experience with interrupted speech has shown that varying the rate of interruption gives a result that is preferred by the user over interruptions that occur at a fixed rate when all other factors are equal. Therefore, a system that interrupts the speech with a randomized pattern is preferred.

This pattern is tailored for receive-only waveforms like VDB. To apply it to the SRGPS Index Formats it could be used as is, or tailored to them. For VDB, it can be assumed that all time slots can be occupied, but for the Index Formats, about 50% of the time is available. This means that the format can be tailored to have less outage of the data or more time dedicated to voice, or a combination of both.

In an exemplary embodiment, the system speeds up the voice using signal processing, so that it fits within the available transmit interval. For example, a Phase Vocoder uses an FFT process that allows time compression of speech without changing pitch. In this case the speech needs a 35% speed up to allow the speech to be transmitted in the 232.5 ms available. A 128-point FFT produces the conversion. At 8,000 samples per second this occupies 16 ms, which allows five conversions during the off time. This information is stored until transmission is allowed and the final portion is transmitted at the end of the time. This method also requires some additional delay to allow for sampling, conversion and reconstruction.

In a further embodiment, the transmitting radio makes real-time decisions, evaluating the transmit voice by inserting a delay of some tens of milliseconds. This delay allows a signal processor to evaluate the audio for speech and determine what to transmit first when the channel is available. If there is no intelligence in that portion of time it may be safely discarded, but if there is speech present, the signal processor can decide to time compress the speech, if necessary. The interruptions may also be tailored to occur for time slots that need to be monitored, based on knowledge of what time slots are in use for this particular airport. Omitting interruptions for unused time slots, will clearly improve intelligibility, so only the worst case needs to be evaluated.

Figure 7:
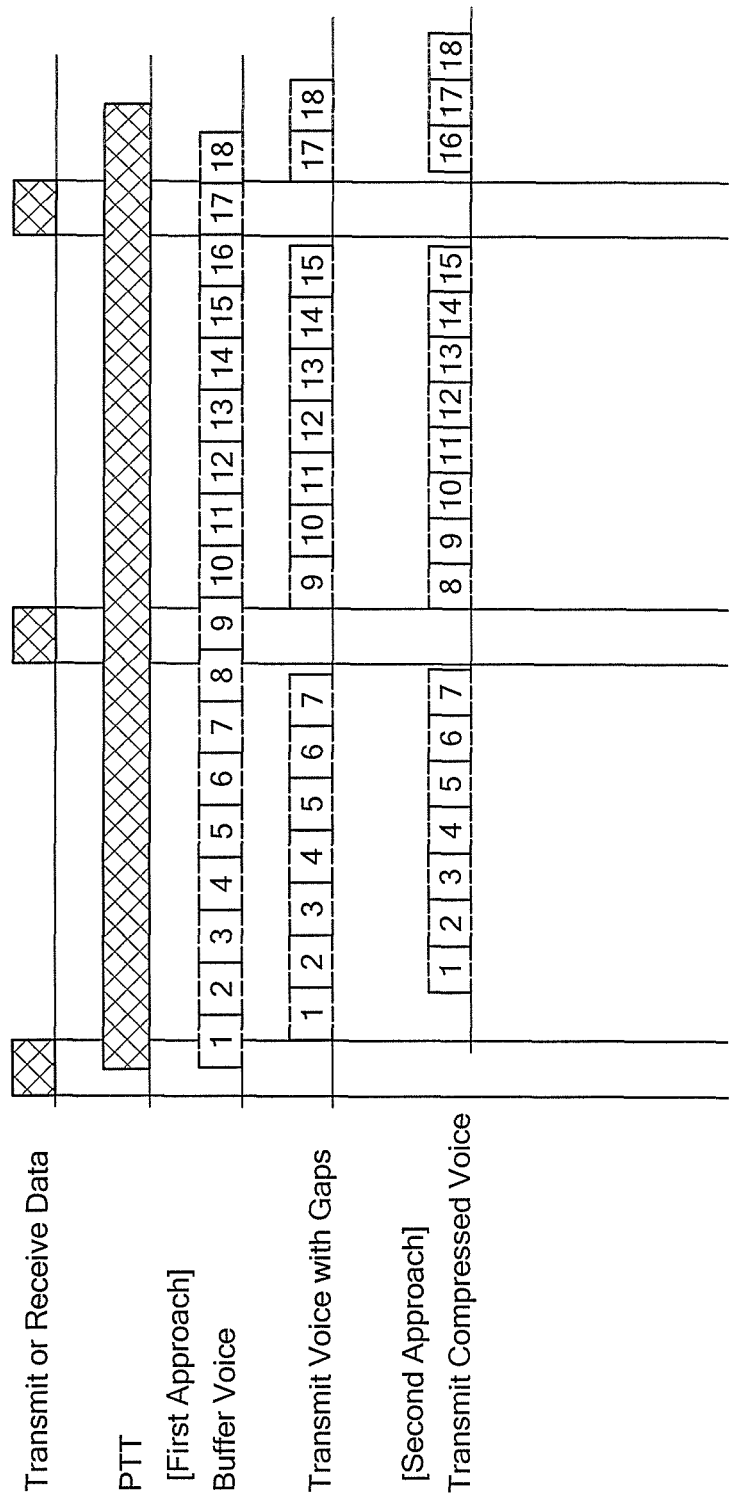
FIG. 7 is an exemplary timing diagram for transmitting speech.

FIG. 7 shows an exemplary timing diagram. The boxes in the top line show time slots dedicated to transmitting or receiving data and gaps between them available for voice. A voice signal will be initiated at a random time with respect to the data, and this is shown as the Push-to-Talk (PTT) signal on the second line. When this occurs the voice may be processed in two ways. Line 3 shows a direct approach wherein the voice is buffered in numbered time slots. The buffered voice is transmitted when the channel is available as shown on Line 4 with interruptions of the voice when the channel is needed for data. The speech arrives at the receiving terminal, but with gaps as a result of the time taken to transmit or receive data, and with some delay because of the buffering. A second approach is to compress the voice so that it can be sent in its entirety in the reduced time available. Line 5 shows the compressed speech from Line 3 being buffered and transmitted in segments that are shorter than the original.

Figure 1:
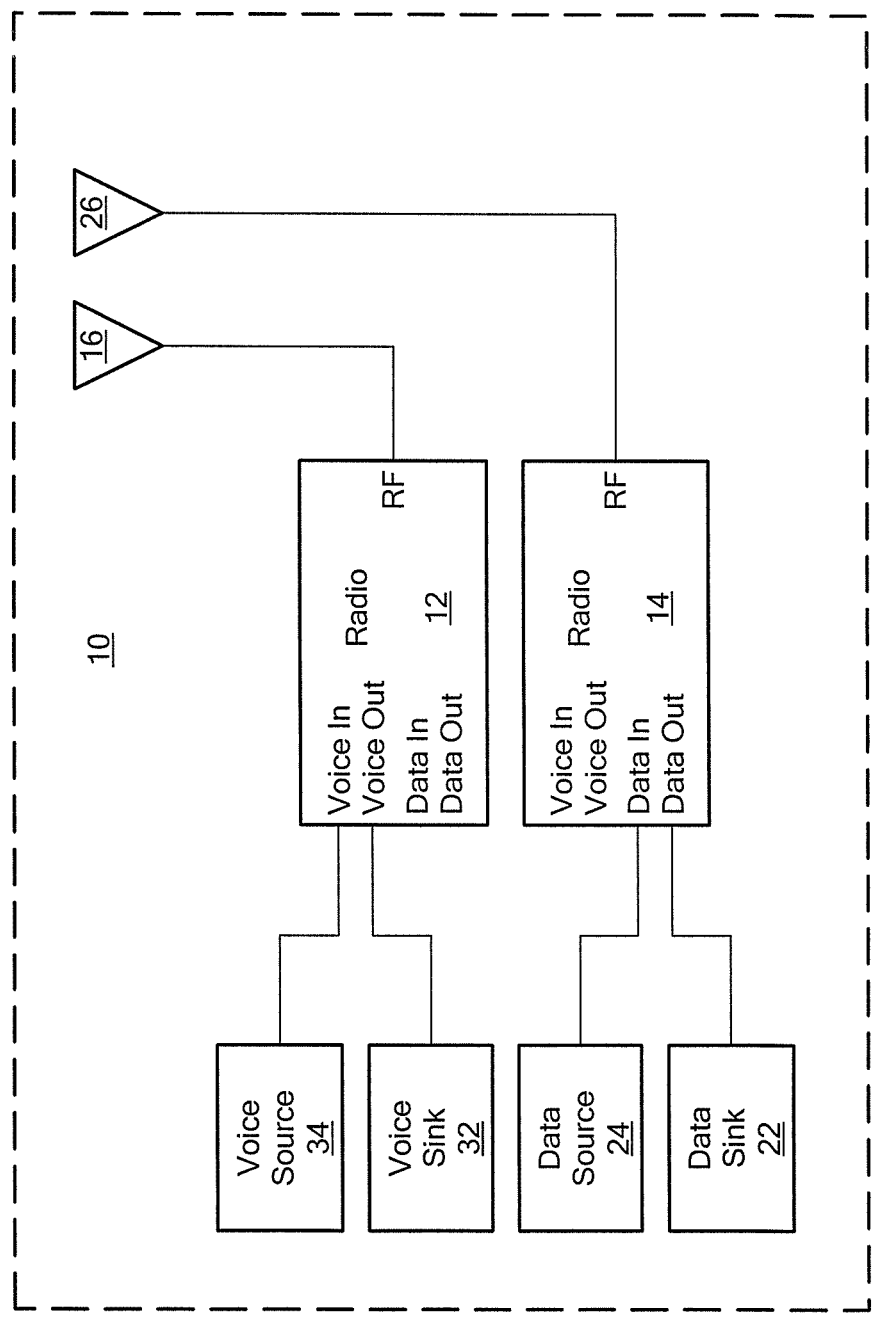
FIG. 1 is a schematic depiction of a prior art data and voice communication system having multiple antennas.

Table 3 "JPALS Waveforms and Interlacing Options" provides a comparison of the range of the impact on the voice and data waveforms for the configurations shown in FIGS. 1, 2 and 3. For Shared Transmitter and Antenna configurations, if data has priority, no data is lost, except for reception errors. The third column applies when a conflict occurs between reception and transmission. This happens intermittently for a frequency hopping mode in which the frequency separation between the two services is too small to provide sufficient isolation. Installations may exist in which a transmitter needs to be shared and the resources to provide isolation cannot be installed. The percentages of interruption shown assume that 2 milliseconds are required to switch the audio off or on.

TABLE 3

JPALS Waveforms and Interlacing Options

| Data Format | Implementation Option | | |
|---|---|---|---|
| | Two Independent Radios | Shared Transmitter and Antenna | Independent Receivers or Transmitter |
| SRGPS Index 1 | No Interruptions | 6% of Downlink Interruption No Uplink Voice Interruption No Data Interruption | Up to 26% of Downlink Voice 6% of Uplink Voice Up to 2 seconds Data Interruption |
| SRGPS Index 2 | No Interruptions | 8% Downlink Voice Interruption No Uplink Voice Interruption No Data Interruptions | Up to 26% of Downlink Voice 8% of Uplink Voice Up to 2 seconds Data Interruption |
| LAAS (VDB) | No Interruptions | No Downlink Voice Interruptions No Uplink Voice Interruptions No Data Interruptions | Up to 26% of Downlink Voice Interruption No Uplink Voice Interruption Up to 2 seconds Data Interruption |

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising: a voice and data communication system having a shared antenna for transmitting and receiving information in time slots, wherein the antenna can only be used for transmit or receive at a given time, determining timing requirements for data transmission and reception; interrupting data transmission for transmission of speech in selected intervals while meeting the data transmission timing and throughput requirements; sensing the presence of speech within an audio input to determine what segments of the audio input may be discarded without degrading intelligibility; and compressing duration of the speech by speeding up the speech to fit within the selected intervals, to preserve the intelligibility of the compressed speech.

2. The method according to claim 1, further including limiting data interruption to a predetermined duration.

3. The method according to claim 1, further including employing independent receivers or transmitters.

4. The method according to claim 1, further including employing shared receivers and/or transmitters.

5. The method according to claim 1, further including employing separate antennas.

6. The method according to claim 1, further including limiting downlink voice interruption to a predetermined amount.

7. The method of claim 1, further including:
amplitude modulating the speech to generate an analog, amplitude modulated speech signal; and
transmitting the analog, amplitude modulated speech signal during the selected intervals.

8. The method of claim 7, further including:
modulating data using Gaussian Minimum Shift Keying (GMSK) or Differential 8-ary Phase Shift Keying (D8PSK); and
transmitting the modulated data.

9. A system, comprising: an antenna; a voice and data communication system sharing the antenna for transmitting and receiving information in time slots, wherein the antenna can only be used for transmit or receive at a given time; a data/voice timing control module to determine timing requirements for data transmission and reception and to interrupt data transmission for transmission of speech in selected intervals while meeting the data transmission timing and throughput requirements; and a speech analysis and control module to sense the presence of speech within an audio input to determine what segments of the audio input may be discarded without degrading intelligibility and to compress duration of the speech by speeding up the speech to fit within the selected intervals, to preserve the intelligibility of the compressed speech.

10. The system according to claim 9, wherein the data interruption is limited to a predetermined duration.

11. The system according to claim 9, further including independent receivers and/or transmitters.

12. The system according to claim 9, further including shared receivers and/or transmitters.

13. The system according to claim 9, further including separate antennas.

14. The system according to claim 9, wherein the data is source and synced by a navigation system.

15. The system according to claim 9, further including a data encoder and a data decoder for the data.

16. The system according to claim 9, further including a transmit/receive switch coupled to the antenna.

17. The system of claim 9 further comprising an RF transmit module to amplitude modulate the speech from the speech analysis and control module to generate an analog, amplitude modulated signal for transmission by the antenna.

18. The system of claim 17 wherein the RF transmit module modulates data using Gaussian Minimum Shift Keying (GMSK) or Differential 8-ary Phase Shift Keying (D8PSK) for transmission by the antenna.

19. A system, comprising:
an antenna;
a speech source, a speech sink, a data source, and a data sink;
a transmit/receive switch coupled to the antenna;
a speech analysis and control module coupled to the speech source;
a data/voice timing control module coupled between the speech analysis and control module and the transmit/receive switch;
a transmit switch coupled to the data/voice timing control module, the speech analysis and control module, and a RF transmit module, which is coupled to the transmit/receive switch;
a speech demodulator coupled to the speech sink;
a RF receive module coupled to the speech demodulator, a data decoder, and a time division control module, which is coupled to the data/voice timing control module; and
a data encoder coupled to the data source, the time division control module, and data/voice timing control module, wherein the data decoder is coupled to the data sink.

* * * * *